US012294670B2

(12) United States Patent
Beardow et al.

(10) Patent No.: US 12,294,670 B2
(45) Date of Patent: May 6, 2025

(54) METHOD FOR MANAGING AN UNALLOCATED TELEPHONE NUMBER IN A COMMUNICATION NETWORK, METHOD FOR PROCESSING A REQUEST FOR ALLOCATING A TELEPHONE NUMBER, CORRESPONDING DEVICES, ITEM OF COMMUNICATION EQUIPMENT, SYSTEM AND COMPUTER PROGRAMS

(71) Applicant: Orange, Issy-les-Moulineaux (FR)

(72) Inventors: Paul Beardow, Chatillon (FR); Frank Derville, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/073,981

(22) Filed: Dec. 2, 2022

(65) Prior Publication Data
US 2023/0179696 A1 Jun. 8, 2023

(30) Foreign Application Priority Data
Dec. 3, 2021 (FR) ...................................... 2112932

(51) Int. Cl.
*H04M 1/27457* (2020.01)
*H04M 3/42* (2006.01)

(52) U.S. Cl.
CPC ... *H04M 1/27457* (2020.01); *H04M 3/42297* (2013.01)

(58) Field of Classification Search
None
See application file for complete search history.

(56) References Cited

U.S. PATENT DOCUMENTS

| 8,781,093 B1* | 7/2014 | Rybak | H04M 3/436 455/414.1 |
| 2012/0027191 A1 | 2/2012 | Baril et al. | |
| 2012/0207285 A1* | 8/2012 | Lawson | H04M 3/30 379/32.04 |

OTHER PUBLICATIONS

French Preliminary Search report for French Application No. 2112932, dated Oct. 18, 2022.
(Continued)

*Primary Examiner* — Harry S Hong
(74) *Attorney, Agent, or Firm* — Knobbe, Martens, Olson & Bear, LLP

(57) ABSTRACT

A method for managing an unallocated telephone number in a communication network, the telephone number being previously allocated to a user of the communication network until a suspension date. The method is implemented by an item of equipment of the network and includes: obtaining information relating to a call set-up request received by the communication network to the telephone number during an observation period of time subsequent to the suspension date; updating, according to the information relating to the call set-up request, information relating to an activity level of the telephone number in the communication network, the information relating to an activity level being representative of a number of requests to set-up a call to the telephone number received by the network for the given observation period and storing in a data table the information relating to an activity level of the telephone number in association with the telephone number.

15 Claims, 9 Drawing Sheets

(56) References Cited

OTHER PUBLICATIONS

French Opinion for French Application No. 2112932, dated Oct. 21, 2022.
French Written Opinion on the Patentability of the Invention for French Application No. FR2112932 dated Oct. 21, 2022.

* cited by examiner

[Fig 1]
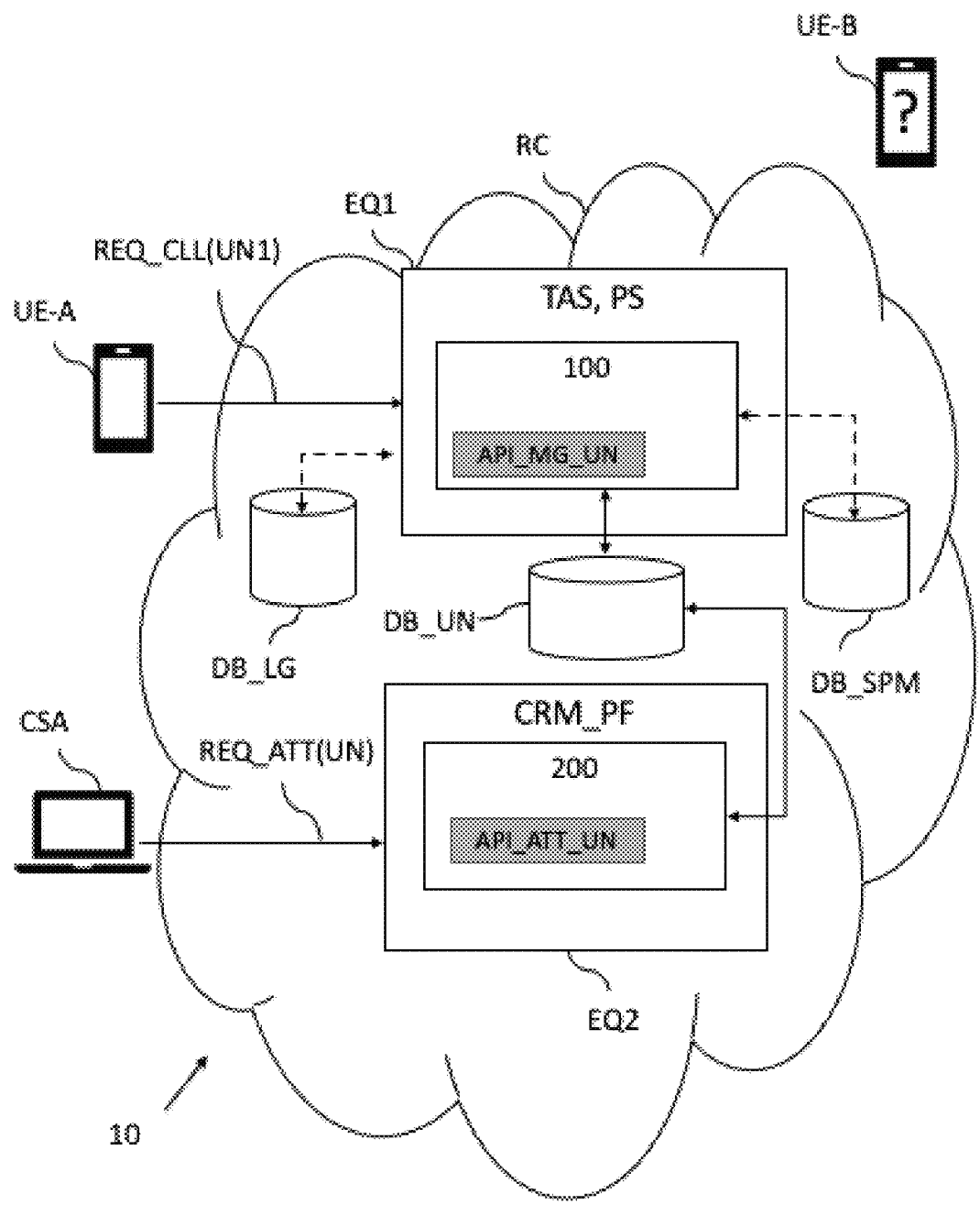

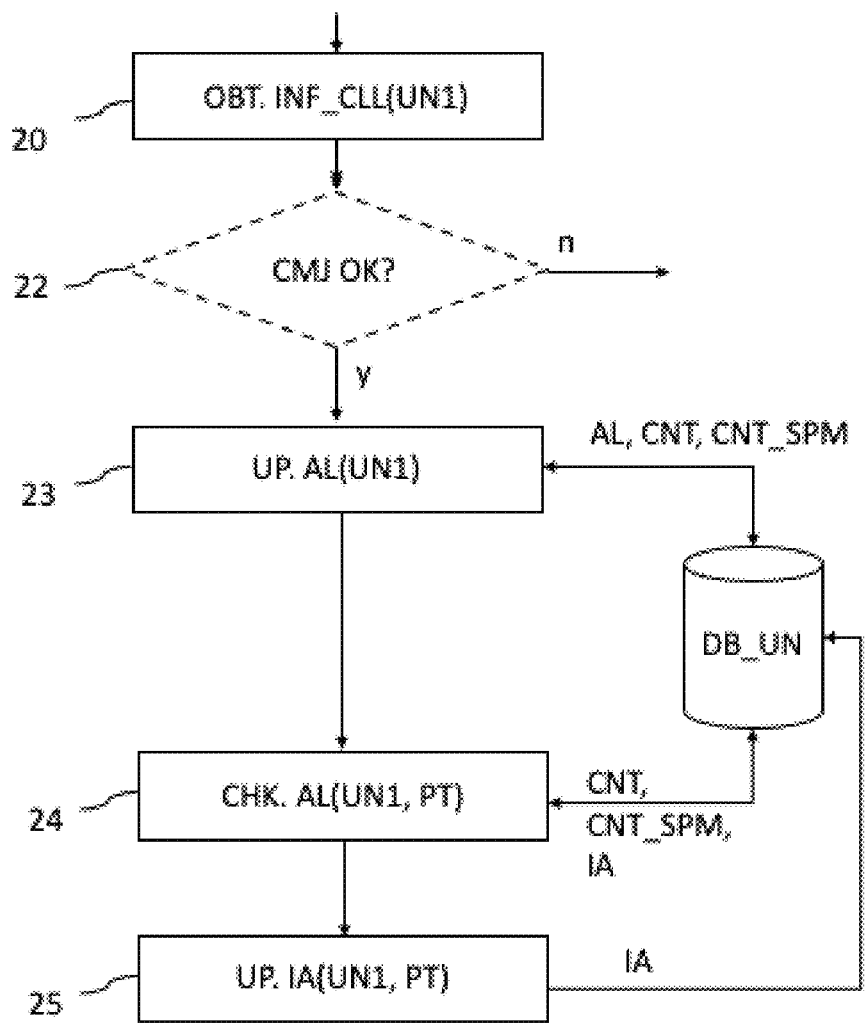
[Fig 2]

[Fig 3A]
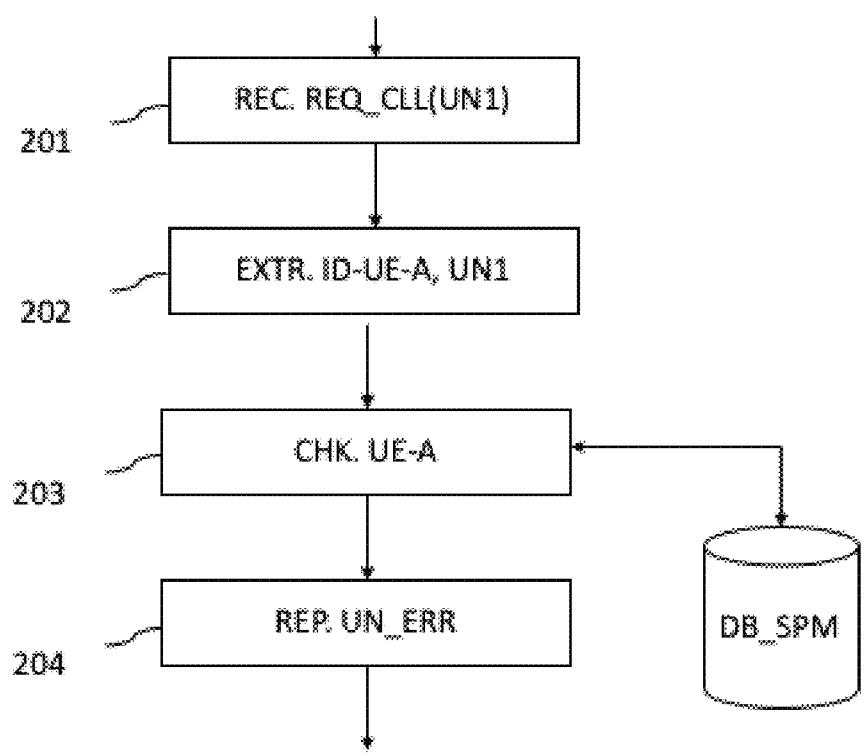

[Fig 3B]
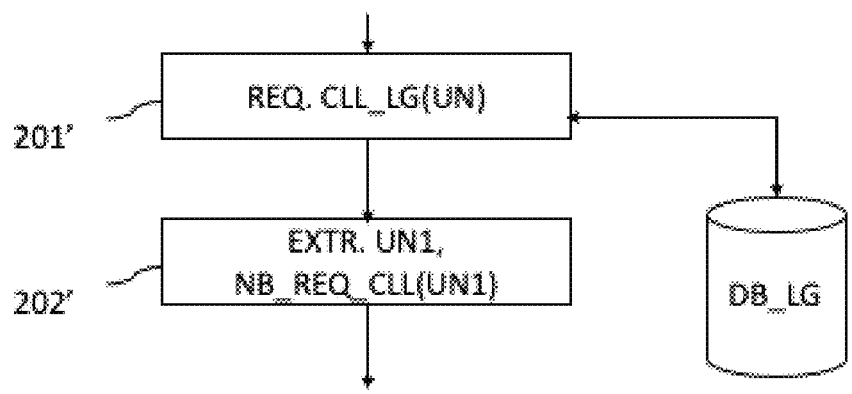

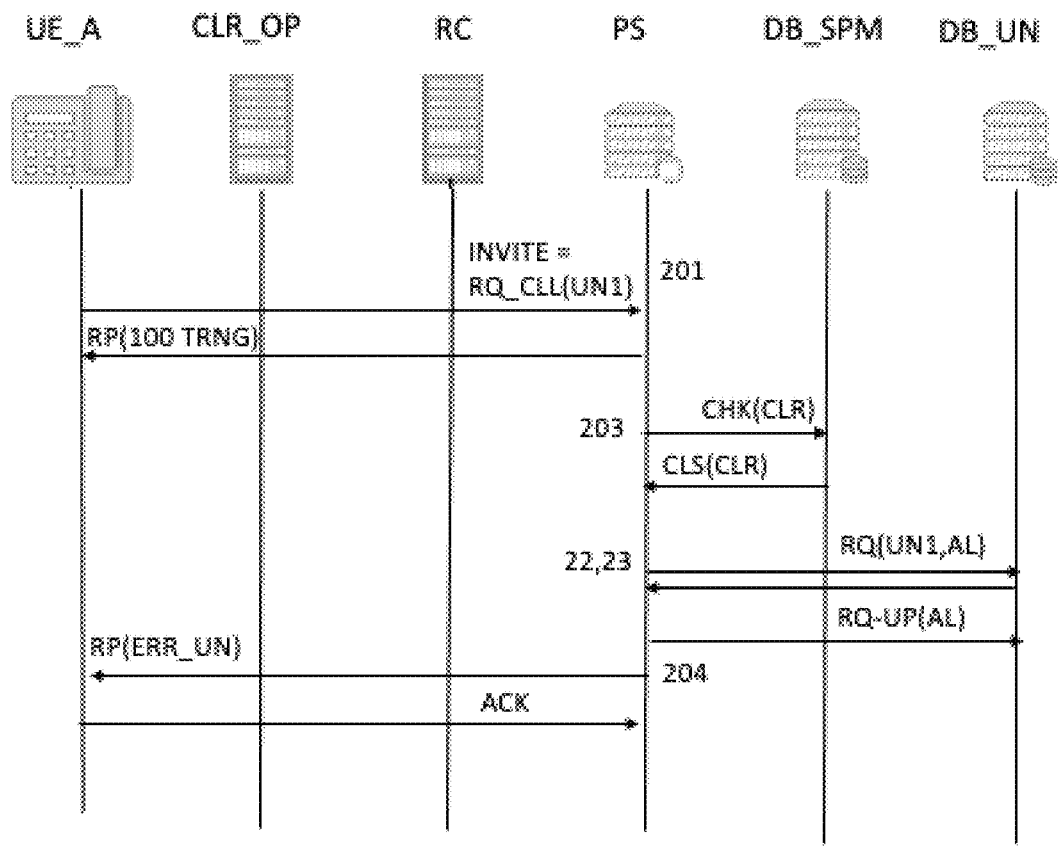
[Fig 4]

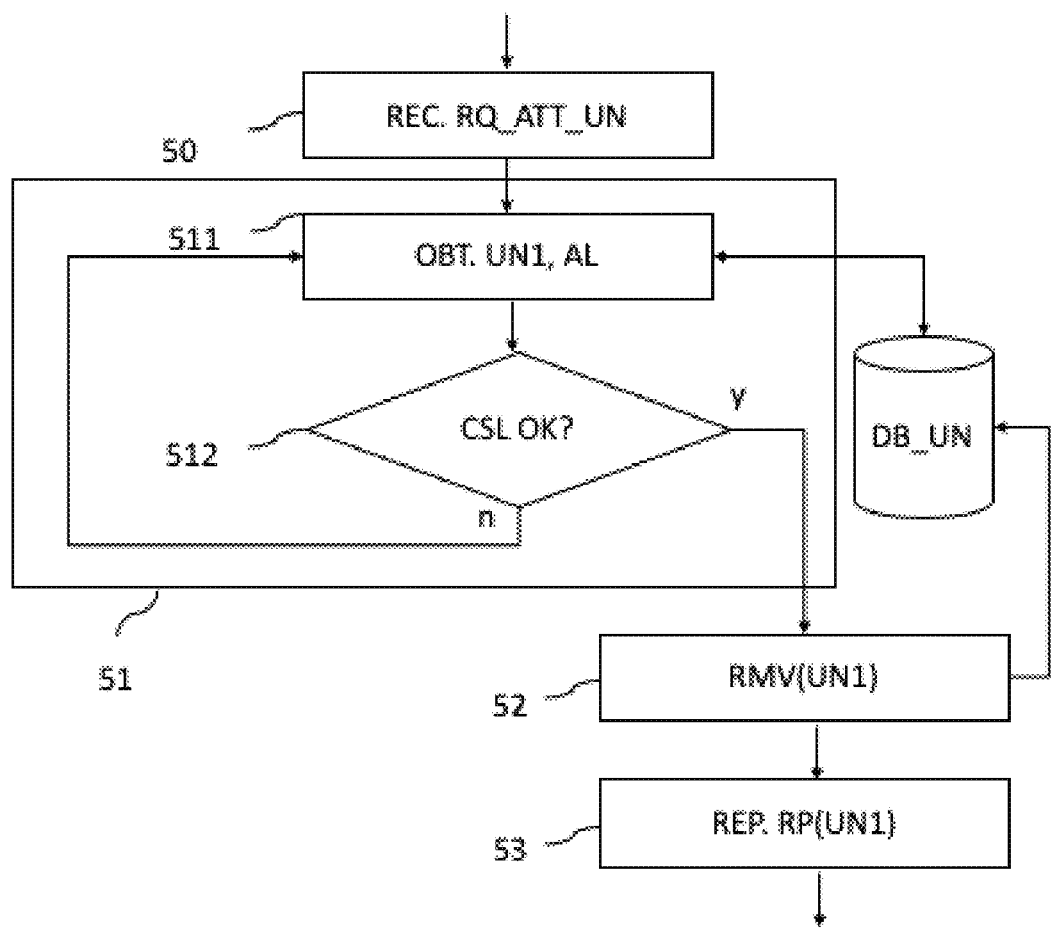
[Fig 5]

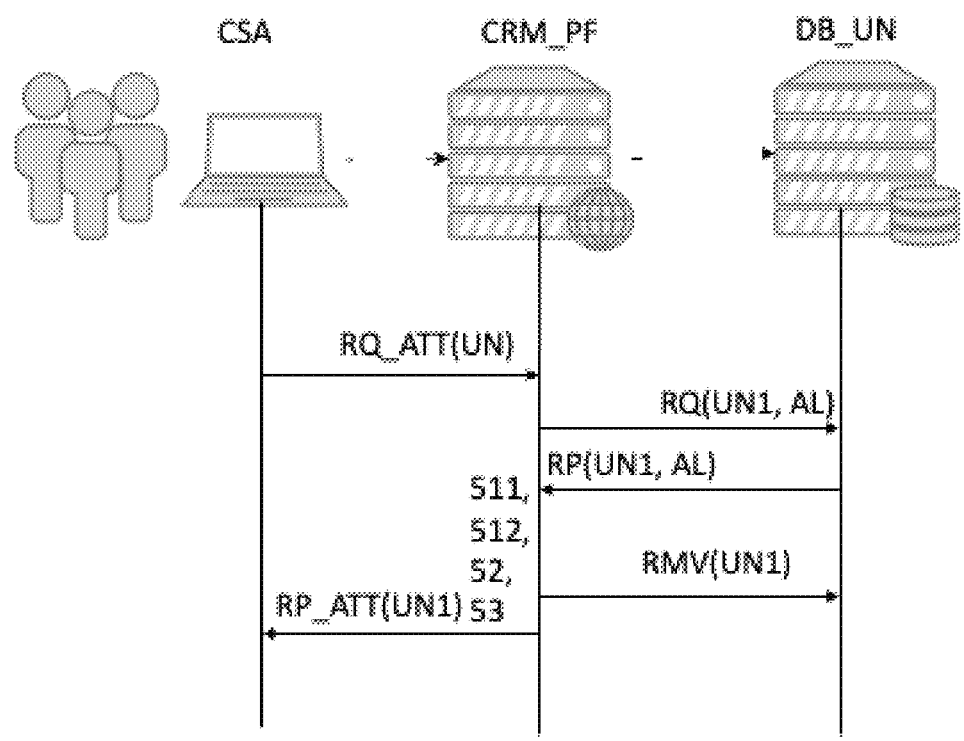

[Fig 7]
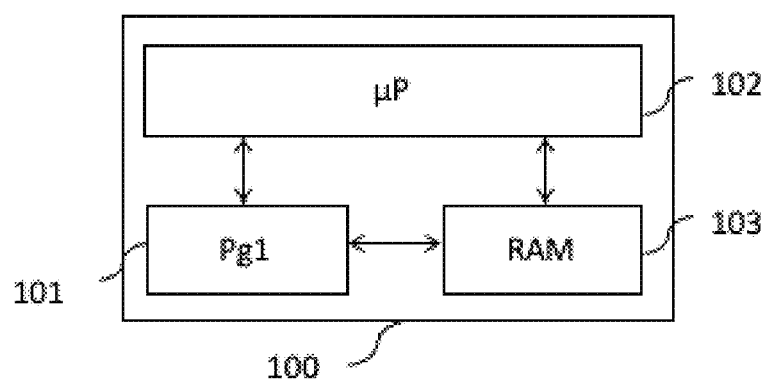

[Fig 8]
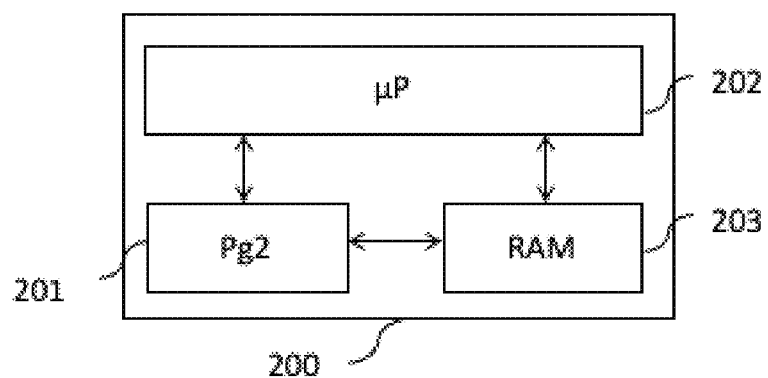

METHOD FOR MANAGING AN UNALLOCATED TELEPHONE NUMBER IN A COMMUNICATION NETWORK, METHOD FOR PROCESSING A REQUEST FOR ALLOCATING A TELEPHONE NUMBER, CORRESPONDING DEVICES, ITEM OF COMMUNICATION EQUIPMENT, SYSTEM AND COMPUTER PROGRAMS

CROSS-REFERENCE TO RELATED APPLICATIONS

This application claims foreign priority to French Patent Application No. FR 2112932, entitled "METHOD FOR MANAGING AN UNALLOCATED TELEPHONE NUMBER IN A COMMUNICATION NETWORK, METHOD FOR PROCESSING A REQUEST FOR ALLOCATING A TELEPHONE NUMBER, CORRESPONDING DEVICES, ITEM OF COMMUNICATION EQUIPMENT, SYSTEM AND COMPUTER PROGRAMS" and filed Dec. 3, 2021, the content of which is incorporated by reference herein in its entirety.

BACKGROUND

Field

The field of the development is that of a communication network configured to route calls to telephone numbers allocated to terminal equipment, such as mobile phones. The development relates in particular to the management of telephone numbers previously allocated to users and their reallocation to other users of the communication network.

Description of Related Art

An operator of a communication network usually has a limited number of telephone numbers to allocate to users subscribing to one of its telephony services. Of all the telephone numbers reserved for this operator, some are actually allocated to users and used by the latter to communicate in the communication network, but others, unallocated, are held in reserve for new subscribers or to respond to telephone number change requests from users already subscribed.

When an operator starts up a new communication network, all telephone numbers are blank, that is without any previous usage history. As time goes by and subscribers leave and arrive, previously allocated telephone numbers are recycled. In general, when a user terminates their subscription with the communication network, their telephone number is deallocated and placed in a suspended state for a given period of time before being reallocated to a new user. This suspension period is intended to prevent the new subscriber from receiving too many calls destined for the previous subscriber. Typically, the operator sets a relatively long suspension period, for example six months.

One disadvantage is that the operator is deprived of this telephone number for the entire suspension period, but there is no guarantee that it will not receive complaints from the new subscriber once the telephone number has been reallocated. Indeed, the period during which this telephone number remains associated with the previous subscriber in lists of sales or fraudulent marketers can be even longer, as these lists are not updated regularly.

As a result, the current solution is not satisfactory for subscribers and is detrimental to the operator's image.

The development improves the situation.

SUMMARY

The development responds to this need by proposing a method for managing at least one unallocated telephone number in a communication network, said telephone number being previously allocated to a user of the communication network until a given date, known as suspension date. Said method is implemented by an item of equipment of the network and comprises:

obtaining a piece of information relating to at least one call set-up request received by said communication network to said telephone number during a given period of time, known as observation period, subsequent to said suspension date;

updating, at least according to said piece of information relating to at least one call set-up request, at least one piece of information relating to an activity level of said telephone number in the communication network, said piece of information relating to an activity level being representative of a number of requests to set-up a call to said telephone number received by the communication network for the given observation period and storing, in an entry of a first data table, known as table of unallocated telephone numbers, said at least one piece of information relating to an activity level of said telephone number in association with said telephone number.

The development is based on a completely new and inventive approach to managing telephone numbers which are reserved for an operator of a communication network but which are temporarily no longer allocated to any user of the network. It is based on updating, on the basis of calls made to that telephone number in the communication network, a piece of information relating to an activity level of that telephone number during a given period of time, and storing in memory the value of that piece of information, in association with that telephone number.

In this way, the data table of previously allocated telephone numbers waiting to be recycled is enriched with this piece of activity level information and when a user of the communication network requests a new telephone number, it can be validly used to decide whether the telephone number is ready to be reallocated or whether the suspension period should be extended.

According to another aspect of the development, the piece of information relating to an activity level comprises a counter of a number of call attempts to said telephone number during the observation period and the update comprises incrementing the counter using the piece of information relating to said call set-up request.

Advantageously, each new call attempt to the unallocated telephone number is counted and stored in memory for the observation period considered.

The number of call attempts counted is an indicator of a residual activity level of the suspended telephone number in the communication network during that period.

It is noted that the piece of information relating to an activity level may additionally comprise other indicators, such as an indicator of the frequency of calls received, for a unit of time equal to one week, for example. Such a piece of information can be used to deduce that the telephone number has been removed from a list used by marketers.

According to yet another aspect of the development, the call set-up request having been transmitted by a calling terminal, said obtaining comprises receiving the call set-up request by said item of equipment of the network and transmitting a response to the calling terminal, said response comprising an error message, indicating that the called telephone number is no longer allocated.

Thus, according to at least one embodiment, the call set-up request counter is updated in real time, while a call set-up request is being processed.

For example, the method is implemented by an item of proxy equipment or by a telephony application server configured to process calls to unallocated numbers and thus to receive any request to set-up a call to an unallocated number.

One advantage is that the piece of information relating to an activity level associated with each unallocated number is updated in real time, while the call set-up request is being processed, as is the data table of unallocated telephone numbers.

According to yet another aspect of the development, said obtaining comprises querying, from said called telephone number, a second data table, known as event table, said second table comprising entries associating with a telephone number error messages issued in response to requests to set-up a call to said telephone number.

Alternatively, according to at least another embodiment of the development, the piece of information relating to at least one request to set-up a call to the unallocated telephone number is obtained by querying an event data table managed by the communication network. This event table is thus stored in a memory of said communication network. The update of the counter of requests to set-up a call to the unallocated telephone number is therefore delayed compared to the processing of the actual call request. Querying the event table may relate to one or more call set-up requests received during a given period, for example, one day, one week, etc., for one or more telephone numbers. For example, the query may relate to all requests received for all unallocated telephone numbers associated with a suspension date prior to a given date. It can be triggered regularly, for example every day.

The counters are then updated according to the result of the query and may therefore relate to several unallocated telephone numbers and several call set-up requests.

One advantage is to decorrelate the management of unallocated telephone numbers and the update of the data table from the call set-up request processing procedure. Indeed, voice over IP communications require real-time processing. It is therefore preferable not to make the processing of call set-up requests more complex to avoid introducing any latency. According to this embodiment of the development, the counter according to the development can be implemented by an item of equipment of the network, for example an application server, which is not configured to receive the call set-up request, but merely to query the event data table and manage the table of unallocated telephone numbers. Advantageously, this update is implemented by an API software application installed on the application server.

According to another aspect of the development, said method comprises:
obtaining a piece of information relating to the caller's membership of at least one given reputation class from at least a third data table, known as reputation table; and
updating the data table of unallocated telephone numbers is further dependent on the caller's membership of the at least one given reputation class.

For example, the at least one given reputation class comprises the class of sales marketers and/or the class of fraudulent marketers.

According to at least one embodiment of the development, only call attempts from these marketers are therefore counted.

In another embodiment, all call attempts are counted, regardless of whether the caller is a marketer or a legitimate caller. Indeed, this indicates that the previous user of telephone number did not inform their contacts that they had changed their telephone number.

According to another embodiment, the piece of information relating to an activity level of an unallocated telephone number comprises a first piece of count information of all call set-up requests made to that telephone number and a second piece of count information specific to call set-up requests from callers belonging to the class of sales marketers or to the class of fraudulent marketers.

Advantageously, specific decision thresholds can be applied to the first and second pieces of count information.

Indeed, calls from this class of callers are perceived as very annoying for the users of a recycled telephone number. It is therefore particularly important to consider the number of calls received from this class of callers over a given period of time to assess a risk that the new user of this recycled telephone number will receive solicitation calls intended for the previous user of this number. This number of calls received represents a level of residual activity of the unallocated telephone number that is made available to the network to decide whether or not this telephone number is ready to be reallocated.

According to yet another aspect of the development, the piece of information relating to an activity level of the telephone number further comprises an activity indicator, said method comprises verifying a value of the activity level of said telephone number during the given observation period, by comparing the value of said at least one counter with a given acceptability threshold and updating said activity indicator, said indicator being set to an "inactive" value when the value of said counter is below the given acceptability threshold and to an "active" value otherwise.

Advantageously, the data table is enriched with an activity indicator that reflects the implementation of a policy for reallocating unallocated telephone numbers to new users. This piece of information can then be directly used by an item of equipment of the network in charge of customer management and reallocation of telephone numbers to new users, by selecting an unallocated telephone number whose activity indicator has the value "inactive".

The development also relates to a device for managing at least one unallocated telephone number in a communication network, said telephone number being previously allocated to a user of the communication network until a given date, known as suspension date. Said device is configured to implement at the level of an item of equipment of the network:
obtaining a piece of information relating to at least one call set-up request received by said communication network to said telephone number during a given period of time, known as observation period, subsequent to said suspension date;
updating, at least according to said piece of information relating to at least one call set-up request, at least one piece of information relating to an activity level of said telephone number in the communication network, said piece of information relating to an activity level being representative of a number of requests to set-up a call to said telephone number received by the communication network for the given observation period and storing, in an entry of a first data table, known as table of unallocated telephone numbers, said at least one piece of information relating to an activity level of said telephone number in association with said telephone number.

Advantageously, said device is configured to implement the steps of the management method as described above.

Advantageously, said device is integrated into an item of communication equipment of the communication network, such as a telephony application server or an item of proxy equipment.

Advantageously, said item of communication equipment is comprised in a system for managing at least one unallocated telephone number in a telecommunication network.

The system, the item of communication equipment and the management device have at least the same advantages as those conferred by the above-mentioned management method.

Correlatively, the development also relates to a method for processing a request for allocating a telephone number to a user of a communication network, said method comprising, upon receipt of said allocation request, selecting said telephone number from a plurality of unallocated telephone numbers and sending a response comprising the selected telephone number.

Said selection comprises:
 obtaining a telephone number and at least one piece of information relating to an activity level of the telephone number in said communication network from a first data table, known as table of unallocated telephone numbers, said table comprising entries, one said entry associating a telephone number previously allocated to users until a given date, known as suspension date, with said piece of information relating to an activity level of the telephone number during a given period of time, known as observation period, subsequent to said suspension date;
 deciding to select said telephone number for said user according to said piece of information relating to an activity level and at least one selection criterion, and
 repeating the previous steps for another telephone number, as long as it has been decided not to select said telephone number.

The development is based on a completely new and inventive approach to reallocating a previously allocated telephone number, which is based on an enriched data table, comprising not only the unallocated telephone numbers but, for each of them, at least one piece of information relating to an activity level of the telephone number in the network during a given period of time. This piece of information is then used to decide, in accordance with a reallocation policy of the operator, whether the telephone number is ready to be reallocated to the user who has requested it, or whether its suspension period should be extended because its residual activity level is still too high.

According to another aspect of the development, the piece of information relating to an activity level of said telephone number in the communication network comprises at least one piece of information relating to a counter of a number of call set-up requests to said number received by said communication network during the given observation period, and the method comprises verifying said at least one selection criterion, said verification comprising comparing said piece of information with a given decision threshold, the decision to select said telephone number being made when the counter value is less than or equal to a given acceptability threshold.

Advantageously, the piece of information relating to an activity level of the unallocated telephone number comprises a counter value of a number of call set-up requests to said number that have been received by said telecommunication network during a given period of time, known as observation period.

According to this embodiment, the decision whether or not to reallocate the telephone number is made on the basis of whether or not a given acceptability threshold is exceeded, which corresponds to a maximum allowed number of call attempts to that telephone number during the given observation period. For example, the threshold is set to 30 call attempts over a 30-day period, that is an average of one call per day. The telephone number is selected when it receives up to 30 calls in 30 days.

According to this embodiment, the number reallocation policy is applied upon request when processing a user-specific allocation request.

According to yet another aspect, the piece of information relating to an activity level of said telephone number comprises an activity indicator intended to take one value among the values "active" and "inactive" and said at least one selection criterion comprises that the activity indicator has the value "inactive".

One advantage of such an indicator, which takes binary values, is that it reflects a decision already made by the communication network and previously stored in the data table. In this way, the operator's telephone number reallocation policy is applied in only one place, for example at the item of equipment of the network that manages the table of unallocated telephone numbers.

According to yet another aspect of the development, the obtaining comprises issuing a request for obtaining an unallocated telephone number to said data table, said request comprising said selection criterion.

One advantage is that the telephone number obtained in response to querying the data table corresponds to an activity indicator set to the value "inactive" and can therefore be directly reallocated to the user who requested it.

The development also relates to a device for processing a request for allocating a telephone number to a user of a telecommunication network, said device being configured to implement the reception of said allocation request, the selection of said telephone number from a plurality of unallocated telephone numbers and the sending of a response comprising the selected telephone number.

According to the development, said selection comprises:
 obtaining an unallocated telephone number and at least one piece of information relating to an activity level of the telephone number in said communication network from a first data table, known as table of unallocated telephone numbers, said table comprising entries, one said entry associating a telephone number previously allocated to users until a given date, known as suspension date, with a piece of information relating to an activity level of the telephone number during a given observation period, subsequent to said suspension date;
 deciding to select said telephone number for said user according to said piece of information and at least one selection criterion, and
 repeating the obtaining and selection of another telephone number, as long as it has been decided not to select said telephone number.

Advantageously, said processing device is integrated into an item of communication equipment of the communication network, such as a customer management platform or a telephony application server.

Advantageously, said item of communication equipment is comprised in the above-mentioned management system.

The system, the item of communication equipment and the processing device have at least the same advantages as those conferred by the above-mentioned processing method.

The development also relates to computer program products comprising program code instructions for respectively implementing management and processing methods as described previously, when it is executed by a processor.

A program can use any programming language, and can be in the form of source code, object code, or intermediate code between source code and object code, such as in a partially compiled form, or in any other desirable form.

The development also relates to at least one computer-readable storage medium on which is saved a computer program comprising program code instructions for implementing the steps of the methods according to the development as described above.

Such a storage medium can be any entity or device able to store the program. For example, the medium can comprise a storage means, such as a ROM, for example a CD-ROM or a microelectronic circuit ROM, or a magnetic recording means, for example a mobile medium (memory card) or a hard disk or SSD.

On the other hand, such a storage medium can be a transmissible medium such as an electrical or optical signal, that can be carried via an electrical or optical cable, by radio or by other means, so that the computer program contained therein can be executed remotely. The programs according to the development can be downloaded in particular on a network, for example the Internet network.

Alternatively, the storage medium or media can be one or more integrated circuits in which the program is embedded, the circuit(s) being adapted to execute or to be used in the execution of the above-mentioned method(s).

According to one embodiment, the present technique is implemented using software and/or hardware components. In this context, the term "module" may be used in this document to refer to a software component, a hardware component or a combination of hardware and software components.

A software component is one or more computer programs, one or more subroutines of a program, or more generally any element of a program or software capable of implementing a function or set of functions, as described below for the module concerned. Such a software component is executed by a data processor of a physical entity (terminal, server, gateway, set-top-box, router, etc.) and is able to access the hardware resources of this physical entity (memories, recording media, communication buses, electronic input/output cards, user interfaces, etc.). Hereafter, resources are understood to be any set of hardware and/or software elements that support a function or service, whether individually or in combination.

In the same way, a hardware component is any element of a hardware assembly capable of implementing a function or set of functions, as described below for the module concerned. It may be a programmable hardware component or a component with an embedded processor for executing software, for example, an integrated circuit, a smart card, a memory card, an electronic card for executing firmware, etc.

Each component of the system described above naturally implements its own software modules.

The various embodiments mentioned above can be combined with each other for the implementation of the present technique.

BRIEF DESCRIPTION OF THE DRAWINGS

Other purposes, features and advantages of the development will become more apparent upon reading the following description, hereby given to serve as an illustrative and non-restrictive example, in relation to the figures, among which:

FIG. 1 shows an example of the architecture of a system for managing a telephone number that is not allocated to a user in a communication network according to the development;

FIG. 2 describes in the form of a flowchart the steps of a method for managing at least one unallocated telephone number in a communication network, according to an embodiment of the development;

FIG. 3A details the obtaining of a piece of information relating to at least one request to set-up a call to an unallocated telephone number in the communication network, according to a first embodiment of the development;

FIG. 3B details the obtaining of a piece of information relating to at least one request to set-up a call to an unallocated telephone number in the communication network, according to a second embodiment of the development;

FIG. 4 describes in the form of a flow diagram the exchanges between a user terminal calling an unallocated telephone number in a communication network and communication equipment of said network, according to an embodiment of the development;

FIG. 5 describes in the form of a flowchart the steps of a method for processing a request for allocating a telephone number to a user, according to an embodiment of the development;

FIG. 6 describes in the form of a flow diagram the exchanges between a service agent requesting the allocation of a telephone number to a new user of a communication network and communication equipment of said network, according to an embodiment of the development;

FIG. 7 describes an example of the hardware structure of a device for managing at least one unallocated telephone number in a communication network according to the development; and FIG. 8 describes an example of a hardware structure of a device for processing a request for allocating a telephone number to a user of the communication network according to the development.

DETAILED DESCRIPTION OF CERTAIN EMBODIMENTS

The development relates, on the one hand, to the management of at least one unallocated telephone number in a communication network, said telephone number having been previously allocated to a user until a given suspension date, and, on the other hand, to the processing of a request for allocating such a telephone number to a new user of this communication network.

The general principle of the development is based on the enrichment, at the communication network, of a data table of telephone numbers that are not allocated by the operator of this network, by associating with a previously allocated telephone number an piece of information relating to an activity level of this telephone number in the communication network. This additional piece of information is used to decide whether this telephone number is ready to be reallocated to a new user or whether its suspension period should be extended.

This piece of information comprises in particular a number of call attempts to this telephone number counted during a given observation period and the development proposes in particular to decide to allocate the telephone number if the number of requests to set-up a call to this telephone number during the observation period is below a given threshold.

One advantage is to ensure an acceptable disturbance level for the new user while optimising the suspension period during which a telephone number that was previously allocated to a user cannot be reallocated to a new user.

The development applies to the processing of voice-over-IP telephone calls by a fixed or mobile communication network, for example using VoLTE (Voice over Long Term Evolution), ViLTE (Video over Long Term Evolution) or VoIP (Voice over Internet Protocol) technology. These different technologies generally rely on a signalling protocol, such as SIP (Signalling Internet Protocol), to establish and manage a telephone communication session.

Naturally, the development is not limited to this protocol and is applicable to any other protocol that enables VoIP call signalling. However, in the remainder of the description, the examples presented will implement this signalling protocol.

In relation to FIG. 1, an example of the architecture of a system 10 for managing at least one unallocated telephone number in a communication network RC according to an embodiment of the development is now presented. In this example, the communication network RC of an operator has been represented schematically as a single entity, without showing its different access networks for simplicity. It is assumed that this communication network RC implements at least one of the VoIP technologies discussed above. In this example, a first item of terminal equipment UE-A connects to a communication network, for example the communication network RC, via a fixed access network (not shown) of the ADSL or fibre type or a wireless access network, according to a Wi-Fi type technology. Naturally, the development is not limited to this example and applies equally well to a cellular type mobile access network, to which the first item of terminal equipment UE-A connects via a 2G to 5G type link. It is assumed that the first item of terminal equipment UE-A issues a request to set-up a call to a telephone number previously allocated to a second item of terminal equipment UE-B by the operator of the communication network RC.

It is noted that the user of the first item of terminal equipment UE-A is not necessarily a subscriber of the operator of the communication network RC. They also may have subscribed with another operator of another communication network (not shown). In this case, their request is transmitted by the communication network of that other operator to the communication network RC, in a manner known per se.

As illustrated in FIG. 1, the system 10 according to the development comprises a first item of communication equipment EQ1 of the communication network RC. It is assumed that this item of communication equipment EQ1 is placed in the path of the call set-up request message sent by the first item of terminal equipment or calling terminal UE-A or that other equipment of the network receiving this message is configured to redirect it to it. This includes, for example, an item of proxy equipment PS, a telephone application server (TAS) or any other item of communication equipment of the network RC, such as a session router. It is indeed configured to examine incoming signalling traffic and determine where to route the traffic and can also be used to record calls in a call table or log.

According to the development, such an item of equipment EQ1 is configured to manage at least a first data table DB_UN, known as table of unallocated telephone numbers, stored in a memory of the communication network RC.

In the particular embodiment shown in FIG. 1, the first item of equipment EQ1 comprises a device 100 for managing an unallocated telephone number in the communication network RC according to an embodiment of the development. It is assumed that this telephone number was previously allocated to a user of the network RC and that it is no longer allocated since a given suspension date.

According to the development, the device 100 is configured to obtain a piece of information relating to at least one call set-up request received by said communication network to said telephone number during a given period of time, known as observation period, subsequent to the suspension date. The device 100 is further configured to update an piece of information relating to an activity level of the telephone number from the piece of information relating to the call set-up request. Advantageously, this piece of information relating to an activity level comprises at least one counter of a number of call set-up requests to said telephone number for the given observation period according to said piece of information obtained and the update comprises incrementing this counter. The device is finally configured to store, in the first data table DB_UN, the updated piece of activity level information for the given observation period, in association with said telephone number.

The device 100 thus implements the method for managing at least one unallocated telephone number according to the development that will be detailed hereafter in relation to FIG. 2. According to an embodiment, it is implemented in the form of an API (Application Programming Interface) software application API_MG_UN, installed on the first item of equipment EQ1. Advantageously, this application is dedicated to the implementation of a service for managing unallocated telephone numbers according to the development.

Indeed, in an operator network such as the network RC, it is common for an application server to host several software applications each implementing a specific service and in particular the service for managing unallocated telephone numbers.

Of course, the development is not limited to this example and also applies when the first item of equipment EQ1 is another item of equipment of the network, such as for example an item of proxy equipment PS, which has previously registered with the application server TAS in order to be forwarded certain call signalling messages.

Alternatively, the device 100 may be independent of the first item of equipment EQ1, but connected to it by any link whatsoever, wired or not.

FIG. 1 also shows an example of the architecture of a second item of equipment of the network EQ2, according to an embodiment of the development. This includes, for example, an item of equipment in charge of customer relationship management CRM, such as a customer management platform CRM_PF. According to this example, the second item of network equipment EQ2 comprises a device 200 for processing a request for allocating a telephone number to a user of the communication network RC. For example, this request is received from a customer service agent CSA, for example installed on a user terminal, such as a laptop or smartphone, connected to the communication network RC and handled by an employee of the operator. According to the development, the device 200 is configured to receive said allocation request, select a telephone number from a plurality of unallocated telephone numbers and send a response to the allocation request comprising the selected telephone number, said selection comprising:

obtaining a telephone number and a piece of information associated with said number, said piece of information relating to an activity level of the unallocated telephone number during a given period of time, known as observation period, from the first data table DB_UN;

deciding whether or not to select said telephone number for said user according to said piece of information relating to an activity level during a given period of time, known as observation period, subsequent to said suspension date, and to at least one selection criterion, and repeating the obtaining and the decision for another telephone number, when it has been decided not to select said telephone number.

Thus, the device 200 is configured to query the first data table DB_UN to select an unallocated telephone number and respond to the allocation request it has received. The device 200 therefore implements the method for processing a request for allocating a telephone number to a user of the communication network according to the development that will be detailed hereafter in relation to FIG. 5.

According to an embodiment, it is implemented in the form of an API software application API_ATT_UN, installed on the second item of equipment EQ2. Advantageously, this application is dedicated to allocating a telephone number to a user using the first data table DB_UN of unallocated telephone numbers, enriched according to the development and stored in a memory of the network RC.

Alternatively, the device 200 may be independent of the second item of equipment EQ2, but connected to it by any link whatsoever, wired or not.

According to another embodiment, both devices 100 and 200 are hosted by a single item of equipment of the network, for example the application server TAS, which in this case manages the whole process according to the development.

In relation to FIG. 2, an embodiment of a method for managing at least one unallocated telephone number in the communication network RC according to an embodiment of the development is now presented in the form of a flowchart.

In the following, it is assumed that it is implemented by an item of proxy equipment PS or by an application server TAS, both of them being configured to receive the call set-up request messages sent by the calling terminals to an unallocated telephone number. As mentioned above, the method in question is implemented, for example, in the form of a software application API_MG_UN.

It is assumed that among this plurality of unallocated telephone numbers, some may still be free of any usage history, but that several telephone numbers have already been previously allocated to at least one user until a given date, prior to the current date, known as suspension date. It is noted that some of these telephone numbers may have previously been used for other services provided by the operator of the communication network RC. For example, they may have been allocated to IoT (Internet of Things) connected objects that need to be equipped with a SIM (Subscriber Identification Module) card. The development relates more specifically to telephone numbers previously allocated to terminal equipment users, known as "suspended".

It is assumed that the communication network RC manages a first data table of unallocated telephone numbers, for example the table DB_UN previously described in relation to FIG. 1, comprising a plurality of entries associated with unallocated telephone numbers in the network and that the item of equipment EQ1, TAS, PS is configured to access this data table and manage the data contained therein.

In 20, a piece of information relating to at least one call set-up request received by said communication network to an unallocated telephone number UN1 during a given time period, known as observation period, is received by the item of equipment EQ1, TAS, PS. The observation period considered is subsequent to said suspension date.

This piece of information can take different forms, two examples of which will be detailed below. Nevertheless, in all cases, it indicates that one or more attempts to reach the unallocated telephone number have been made by one or more calling user terminals, such as the first item of terminal equipment UE-A of FIG. 1. It is assumed that the user of this terminal UE-A is trying to reach a user of the second item of terminal equipment UE-B and is not aware that the telephone number UN1 they dialled is no longer allocated to the user of the second item of terminal equipment UE-B.

In 22, one or more update criteria are taken into consideration. A first update criterion example is temporal and relates to the telephone number suspension date. For example, this criterion may be to take into account the information obtained in 20 only for telephone numbers that have been suspended for a minimum suspension period. For example, this minimum suspension period is chosen to be six months.

A second update criterion example could be related to the type of caller and limit the consideration of the information obtained in 20 to call attempts from callers such as sales or fraudulent marketers, because this type of call is perceived as particularly annoying by users.

A third update criterion example may be related to the observation period considered and consist in verifying that it has not expired. In this case, if a new observation period has started, the piece of activity level information of the telephone number should be updated for this new period. For example, the observation period is 30 days.

If at least one update criterion is not met, the method terminates and no update of the data table is implemented for the telephone number UN1.

On the contrary, if one or more update criteria are met, an update 23 of the piece of activity level information AL is triggered. According to the development, this activity level comprises an piece of information relating to a counter CNT(UN1) of a number of call set-up requests to the telephone number UN1 received during the given observation period. In case the observation period has not expired since the previous update, the update comprises incrementing this counter with the number of requests received. If the observation period has expired and a new one has started, the counter is reset before being incremented.

The updated value of the piece of activity level information AL, comprising in particular that of the counter CNT, is then stored in memory, in the data table DB_UN, for example in association with an identifier of the current observation period and the telephone number UN1. Advantageously, the previous value of the counter is kept in association with an identifier of the previous observation period, which makes it possible to obtain a history of call attempts to the telephone number UN1 over time.

Optionally, in 24, the piece of activity level information AL associated with the telephone number UN1 is obtained from the data table DB_UN for verification. In this example, it is assumed to comprise at least one counter CNT, CNT-_SPM of a number of call attempts to the telephone number UN1 during a given observation period and an activity indicator IA. This indicator IA takes one of two predetermined values, a first one corresponding to an "inactive" state and a second one to an "active" state. Advantageously, this verification consists in verifying that the indicator IA is set to a correct value and it comprises comparing the counter value(s) obtained with given acceptability thresholds TH, TH_SPM. If the value(s) is/are less than or equal to the respective thresholds, then it is decided to set the activity indicator IA to "inactive". If the activity indicator IA stored in memory for the current observation period is not set to this value, an update request is sent to the data table DB_UN in 25.

It is understood that this embodiment of the development makes it possible to store in the table a state value of the unallocated telephone number UN1, which can be directly used by another item of equipment of the network RC, for example configured to allocate a telephone number from the table DB_UN to a new user of the network RC. This aspect will be detailed below in relation to FIGS. 5 and 6.

It is noted that the above examples are presented by way of illustration, without loss of generality, other embodiments being possible.

In relation to FIG. 3A, the obtaining 20 of the piece of information relating to at least one call set-up request to an unallocated telephone number according to a first embodiment of the management method according to the development is now detailed.

In 201, a signalling message comprising a call set-up request REQ_CLL(UN1) to the telephone number UN1 is received by the item of equipment EQ1, PS, TAS.

In 202, a caller identifier, such as their telephone number or MSISDN (Mobile Station International Subscriber Directory Number) and the called party's telephone number UN1 are extracted from the received message. The MSISDN identifier of the called party is indeed used to route a call to that called party.

Optionally, in 203, a verification of the caller UE-A is carried out from their telephone number by querying at least one data table stored in a memory of the network RC, for example the data table DB_SPM of FIG. 1 comprising information relating to callers considered as sales or fraudulent marketers. A response is received with a caller type associated with the caller's telephone number, if a record was found in the table DB_SPM and an error message otherwise. Advantageously, the type of caller received is stored in memory in association with the telephone number UN1 and an identifier of the call set-up request received.

In 204, a response comprising an error message UN_ERR is transmitted to the caller's terminal UE-A, indicating that the telephone number UN1 is no longer allocated and that the call is rejected.

In relation to FIG. 3B, the obtaining 20 of the piece of information relating to at least one call set-up request to an unallocated telephone number according to a second embodiment of the management method according to the development is now detailed.

In this example, the piece of information relating to at least one call set-up request to an unallocated telephone number is obtained by querying in 201' a data table DB_LG or event table (or "logs") stored in a memory of the network RC, as illustrated in FIG. 1. For example, a query REQ_CLL (UN1) is transmitted to the table DB_LG, comprising a period of time considered, for example equal to the observation period or to a fraction of the observation period and a type of event searched. This involves for example looking for events such as the rejection of a call set-up request due to an unallocated requested telephone number.

A response is received from the data table DB_LG, comprising 0, 1 or more event reports relating to 0, 1 or more unallocated telephone numbers, matching the query criteria.

In 202', the allocated telephone numbers concerned by the received event reports are extracted from the received response together with information relating to each of the associated call set-up requests. A number of call set-up requests to each of the unallocated telephone numbers is derived from the extracted information for the query period considered.

Advantageously, a telephone number of the caller is also extracted from the received event reports and it is used to query the data table DB_SPM.

Next, steps 22 and 23 of the management method according to the development, which have been previously described, are implemented for each of the unallocated telephone numbers obtained.

In relation to FIG. 4, a flow diagram of the messages exchanged between different equipment of the communication network RC following the reception of a call set-up request to an unallocated telephone number is now detailed. In this example, it is assumed that the signalling messages exchanged are SIP protocol compliant.

The item of terminal equipment or calling terminal UE-A of FIG. 1 is considered and it is assumed that it sends a call set-up request REQ_CLL(UN1) to the telephone number UN1, which it believes to be allocated to the second item of terminal equipment or called terminal UE-B, in an SIP INVITE message.

The SIP INVITE message is received by the communication network CLR_OP of the calling terminal UE-A which retransmits it to the communication network RC of the operator that manages the number UN1 previously allocated to the called terminal UE-B, where the development is implemented.

Upon receipt of the INVITE message by the network RC of the called party, the called party's network checks with the HSS (Home Subscriber Server) server that the called telephone number is allocated to a subscribed user and obtains the required information to route the call to that subscriber. For mobile communication networks whose architecture is UMTS or LTE compliant, the HSS server is the concatenation of the HLR (Home Location Registry) registry of the GSM and Edge networks and the authentication services. It is a database comprising telephone numbers allocated to the operator and for each of them, at least one identifier of the subscriber to whom it has been allocated.

If the called party's telephone number is an allocated number, the network RC routes the call to it and the call is terminated normally.

If, on the contrary, the called party's telephone number is an unallocated number, the call is transferred to a proxy server PS configured to perform the following operations:
  receiving the SIP invite message in 201;
  acknowledging the SIP INVITE message with a message RP(100TRNG) of type "100 Trying";
  extracting, in 202, the phone numbers of the caller and the called party from the received message;
  searching for the phone number of the caller in a reputation data table DB_SPM of the network RC, comprising entries associating with a caller's telephone number reputation information, such as for example a type of caller. A caller type comprises, for example, a sales type and refers to sales marketers, a fraudulent marketer (for example "spam calls, where marketers are referred to as "spammers") and a legitimate type.

This reputation table DB_SPM is updated by the operator on an ongoing basis, in a manner known per se.

Note that in other embodiments, the proxy server PS does not implement the operation of looking up the caller's telephone number in a reputation data table DB_SPM of the network RC. This is indeed optional, as it may also be relevant to take into account that legitimate callers, for example contacts of the previous user of the suspended phone number, continue to try to reach this user because they have not been informed of the change in phone number.

Caller reputation information can be obtained in a number of ways by the operator of the communication network. According to a first embodiment, the latter uses reports sent by users who have already received calls from this caller to indicate that the caller is a telemarketing company, for example. According to a second embodiment, the operator can analyse call records to identify sales or fraudulent marketers on the basis of predetermined call patterns. For example, a sales marketer typically makes many calls to many different people over a short period of time. A fraudulent caller seeks to incite the called party to call back on a premium rate telephone number by making numerous short calls and hanging up before the called party can answer ("ping calls");

if the caller's telephone number is present in the data table DB_SPM and after checking in 22 that any update criteria of the table DB_UN are met, query (RQ(UN1, AL)) the piece of activity level information associated with the telephone number UN1 in the telephone number data table DB_UN, update this information and request in 23 in a query message RQ_UP(AL, UN1) the storage of this piece of updated information AL in the data table DB_UN for the telephone number UN1. This update includes at least the incrementation of a counter CNT of calls received to the UN1 number for the observation period;

respond in 204 to the caller's CLR_OP network with an error message, for example a "404 Failure" SIP message to indicate that the call set-up request is rejected because of an unallocated telephone number.

In this respect, it is noted that in older systems, for example SS7/ISUP, the error message is of the type "Cause Code 1". The ISUP system is used to establish wired connections between exchanges. It comprises messages associated with connecting and disconnecting calls. ISUP is the protocol used to support the signalling required to provide voice and non-voice services in telephone communications. It is an extension of SS7 (Signalling System No. 7), which is used as an interface protocol for voice and data within the public switched telephone network (PSTN), as well as for the inputs/outputs of this network.

This error message is transmitted by the caller's CLR_OP network to the calling party's UE-A terminal.

The error is displayed to the caller and the call is terminated with an ACK message to acknowledge the error message.

The proxy server PS thus implements the method for managing at least one unallocated telephone number in the communication network RC just described in relation to FIGS. 2 and 3A. Advantageously, this method is implemented in the form of a software application API_MG_UN.

As a variant, the management method just described is implemented at the level of a TAS application server which, because it is configured to monitor traffic and update databases, has the resources to do so. Advantageously, the software application API_MG_UN is loaded and executed by the TAS application server.

In this respect, it is noted that the SIP INVITE message is routed in the operator's communication network RC by means of several items of communication equipment such as routing equipment, session controller equipment and telephony application servers (TAS). In particular, such an application server is configured to retransmit the SIP INVITE messages it receives to communication equipment or software applications configured to render dedicated services related to the processing of a telephone call. These items of communication equipment and software applications were previously registered with the TAS application server. These include, for example, billing and proxy services. A proxy server such as the PS server is a server that acts as an intermediary and whose main purpose is to hide network details from external connections in order to maintain its security. The proxy transmits requests to sensitive areas of the network without sharing any details of the network, such as the IP address. The software applications in question may be hosted by the application server itself or by a separate communication device such as the PS server.

In relation to FIG. 5, a method for processing a request for allocating an unallocated telephone number to a user of the communications network RC according to an embodiment of the development is now described. In this example, the process is implemented by an item of equipment EQ2 of the communication network RC, for example the customer management platform CRM_PF of FIG. 1. For example, the processing method in question is implemented in the form of a dedicated software application API_ATT_UN, which was previously loaded into the item of equipment EQ2, CRM_PF.

In 50, a, allocation request REQ_ATT_UN of a telephone number to a user of the communication network RC is received by the CRM_PF platform from a service agent CSA.

In 51, a telephone number is selected from a plurality of telephone numbers reserved for the operator of the communication network RC and currently unallocated as follows:

in 511, an unallocated telephone number UN1 is obtained by querying the data table of unallocated telephone numbers DB_UN, stored in a memory of the operator's communication network RC. According to the development and in accordance with what has been previously described in relation to FIGS. 2, 3A-3B and 4, this table DB_UN associates, with the telephone number UN1, information relating to an activity level of the telephone number UN1 in the network RC during a period of observation for example equal to 30 days.

Advantageously, it is specified in the query RQ(UN1) that the required telephone number must no longer be allocated for at least a given suspension period, for example equal to six months. Alternatively, the data table handles this aspect on its own and only proposes unallocated telephone numbers that meet this criterion.

The observation of such a suspension period, during which an unallocated telephone number cannot be reallocated, has two purposes: firstly, to allow users who had saved this telephone number in their contacts to realise that this number is no longer valid, i.e. that it is no longer associated with the user indicated in their contacts. If the phone number was immediately reallocated, the new user of that phone number would receive many calls intended for the previous user. This period varies from operator to operator, but is generally at least 90 days.

The table response therefore includes an unallocated telephone number UN1 and at least the value of a piece of information AL related to an activity level of this telephone number UN1 for the current observation period;

in 512, the piece of information AL is extracted from the response and evaluated using selection criteria CSL. According to a first embodiment of the development, the extracted piece of information AL comprises a counter of a number of call set-up requests to that telephone number received during the observation period. The counter value is compared to a given acceptability threshold TH, TH_SPM. For example, the piece of count information CNT received indifferently relates to all call attempts received and the acceptability threshold TH is set between 20 and 30 for a 30-day period. Advantageously, the response received comprises another piece of count information CNT_SPM relating to call attempts from commercial or fraudulent marketers and the acceptability threshold TH_SPM is set at 4 call attempts in the observation period. If the counter or counters are less than or equal to their respective thresholds, the telephone number UN1 is considered ready for reuse and is therefore selected and the method goes to step 53.

According to a second embodiment, the piece of extracted information AL comprises an activity indicator IA of the telephone number set to the value "active" or "inactive". Advantageously, the selection criterion CSL is to select a telephone number whose indicator IA has the value "inactive". If this is the case, the telephone number UN1 is selected and the method goes to step 52.

Otherwise, as the CSL selection criteria are not met, the UN1 telephone number is not selected and the process repeats step 511 in order to obtain another candidate UN2 telephone number for reallocation.

It is assumed that telephone number UN1 has been selected. In 52, a request to delete the record corresponding to telephone number UN1 is sent to data table DB_UN. In 53, a response message is sent to the requesting service agent, including the telephone number UN1.

Note that there are several ways to access the database. A first option is to access it indirectly through the application server TAS or any other network equipment involved in call routing and configured to query the database DB_UN. This querying is done for example through a dedicated software application or via a direct connection to the database and a query language such as SQL, for example. In the first case, the TAS updates the number of call attempts to a telephone number, which attempts may be from "spammers".

A second option is that the customer management platform CRM_PF accesses the database DB_UN directly through a secure software application or API designed to request information on a telephone number from the database DB_UN and verify that it can be reallocated from the information obtained. The connection between the platform CRM_PF and the database DB_UN can be made via the Internet.

A third option is that the customer management platform CRM_PF accesses the entire database DB_UN in the form of a file, for example a spreadsheet file, in CSV (Comma-Separated Values) format, in which the data is separated by commas. The file in question is, for example, exported by the application server TAS or any other item of server equipment of the network configured to access the database DB_UN, then shared with the management platform CRM_PF via a secure connection, such as a connection set up according to the SSH File Transfer Protocol (SFTP), for it to import it into its software system. This file can then be imported into other software systems. These CSV files are generally shared over secure connections, such as SFTP (Secure File Transfer Protocol) connections.

In relation to FIG. 6, a flow diagram of the messages exchanged between different network equipment following the reception of a request for allocating an unallocated telephone number to a user in accordance with an example of an embodiment of the development is now described in detail. In this example, it is assumed that a CSA customer agent connects to the platform CRM_PF to request a new SIM card for a new user of the communication network RC. Upon receipt of the request RQ_ATT(UN) issued by the agent CSA, the platform CRM_PF requests an unallocated telephone number from the data table DB_UN for this new SIM card.

Advantageously, the platform CRM_PF specifies in its request RQ(UN1) that it wishes to obtain a number which has not been allocated for at least a given suspension period, for example equal to six months. Alternatively, the data table handles this aspect on its own and only proposes unallocated telephone numbers that meet this criterion.

In response, the platform CRM_PF obtains in 511 the telephone number UN1 and at least one piece of information AL relating to an activity level of the telephone number UN1 during a current observation period, for example equal to the previous 30 days. As previously described, this involves for example one or more counter values CNT, CNT_SPM of a number of received calls to that telephone number during the observation period or the value of an activity indicator IA. In 512, it verifies with the piece of information AL obtained that the telephone number UN1 meets the predefined selection criteria CSL. For example, it compares the value or values of counters obtained to one or more given threshold(s) TH, TH_SPM and decides to select the telephone number UN1 if none of the thresholds is crossed. Alternatively, it checks that the activity indicator IA has the value "inactive". It therefore decides to select or not to select the telephone number UN1.

If the telephone number is selected, it responds in 53 to the CSA agent with the telephone number UN1 allocated to the user and also provides the details of the new SIM. In 52, the CRM platform request the data table DB_UN to delete the entry associated with the telephone number UN1 which is now reallocated. It also updates the server HSS/HLR with the details of the new SIM and the telephone number UN1 to be associated with that SIM.

Otherwise, the operations 511 and 512 are repeated until a telephone number can be selected.

In relation to FIG. 7, an example of a hardware structure of a device 100 for managing at least one telephone number not allocated to a user in a local communications network according to the development is now presented, said telephone number being previously allocated to a user of the communications network until a given date, known as suspension date said device comprising at least one module for obtaining apiece of information relating to at least one call set-up request received by said communication network to said telephone number during a given time period, known as observation period, subsequent to said suspension date, a module for updating at least one piece of information relating to an activity level of the telephone number in the network for the given observation period from said information obtained and a storage module, in a first data table, known as table of unallocated telephone numbers, of said information relating to an activity level of the telephone number in association with said telephone number and a piece of information relating to said given observation period. This piece of information AL comprises at least one counter of a number of call set-up requests to said telephone number received by the communication network for the given observation period and the update comprises at least the incrementation of said counter.

Advantageously, the device 100 further comprises a module for receiving a call set-up request to the unallocated telephone number and a module for responding to said request.

According to another embodiment of the development, the device 100 comprises a module for querying a second data table, known as event data table, stored in a memory of said network, said second table comprising records associating with a telephone number error messages issued in response to call set-up requests to said telephone number.

Advantageously, the device 100 also comprises a module for obtaining information on the caller's membership of a reputation class of at least one third data table, known as reputation table comprising entries associating reputation information, such as for example a caller type, with the telephone number of a caller and a verification module configured to verify a criterion relating to the caller type.

The term "module" can correspond to a software component as well as to a hardware component or a set of hardware and software components, a software component itself corresponding to one or more computer programs or sub-programs, or more generally, to any element of a program capable of implementing a function or set of functions.

More generally, such a device 100 comprises a random access memory 103 (a RAM memory, for example), a processing unit 102 equipped for example with a processor and controlled by a computer program Pg1, representative of the modules for obtaining, updating and storing, stored in a read-only memory 101 (a ROM memory or hard disk, for example). At initialisation, the code instructions of the computer program are for example loaded into a random access memory 103 before being executed by the processor of the processing unit 102. The random access memory 103 can also contain a copy of the value information of the activity level information, of caller type, of suspension period, etc., obtained for example from the data table of unallocated telephone numbers DB_UN, the event data table DB_LG. It can also include the update criteria CMJ of the piece of information relating to an activity level of the telephone number.

FIG. 7 only shows a particular one of several possible ways of realising the device 100, so that it executes the steps of the method for managing at least one unallocated telephone number to a user in a communication network as detailed above, in relation to FIGS. 2, 3A and 3B in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, an SD card, a USB flash drive, CD-ROM or DVD-ROM) or non-removable storage medium, this storage medium being partially or totally readable by a computer or a processor.

The different embodiments have been described above in relation to a device 100 integrated into an item of communication equipment EQ1, such as a proxy server PS or a telephony application server TAS, but it can also be separate from this item of equipment and connected to it by a wired or wireless interface.

Also shown, in relation to FIG. 8, is an example of a hardware structure of a device 200 for processing a request for allocating a telephone number to a user of a communication network according to the development, comprising at least one module for receiving said allocation request, a module for selecting said telephone number from a plurality of unallocated telephone numbers and a module for sending a response comprising the selected telephone number, said selection module being configured for:

obtaining at least one unallocated telephone number and at least one piece of information associated with said number, said piece of information relating to an activity level AL of the telephone number during a given period of time, known as observation period, from a first data table, known as table of unallocated telephone numbers;

deciding to allocate said telephone number to said user, according to said information and to at least one decision criterion, and repeating the preceding operations with another telephone number, when it has been decided not to select the telephone number.

Advantageously, the device 200 comprises a module for sending a request to delete the entry associated with said unallocated telephone number from the table of unallocated telephone numbers.

The term "module" can correspond to a software component as well as to a hardware component or a set of hardware and software components, a software component itself corresponding to one or more computer programs or sub-programs, or more generally, to any element of a program capable of implementing a function or set of functions.

More generally, such a device 200 comprises a random access memory 203 (a RAM memory, for example), a processing unit 202 equipped for example with a processor and controlled by a computer program Pg2, representative of the modules for receiving, selecting and transmitting a response, stored in a read-only memory 201 (a ROM memory or hard disk, for example). At initialisation, the code instructions of the computer program are for example loaded into a random access memory 203 before being executed by the processor of the processing unit 202. The random access memory 203 can also contain information obtained from the data table of unallocated telephone numbers, the criteria for selecting a telephone number, etc.

FIG. 8 only shows a particular one of several possible ways of realising the device 200, so that it executes the steps of the method for processing a request for allocating a telephone number as detailed above, in relation to FIGS. 5 and 6 in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 200 is realised with a reprogrammable computing machine, the corresponding program (i.e. the sequence of instructions) can be stored in a removable (such as, for example, an SD card, a USB flash drive, CD-ROM or DVD-ROM) or non-removable storage medium, this storage medium being partially or totally readable by a computer or a processor.

The different modes of implementation have been described above in relation to a device 200 integrated into an item of communication equipment EQ2, such as a customer management platform CRM_PF, but it can also be separate from this item of equipment and connected to it by a wired or wireless interface.

The development that has just been described in its different embodiments has many advantages. Indeed, by enriching a data table of the operator comprising telephone numbers reserved for the operator but currently unallocated to users, using information relating to a residual activity level of a telephone number previously allocated to a user in the communication network, it allows the operator to decide more efficiently and securely, according to that activity level, whether or not the telephone number in question is ready to be reallocated to a new user. This decision is taken at the end of an incompressible suspension period, which can therefore be reduced, for example from 6 to 3 months. In this way, the telephone number can be put back into service as soon as it can be established that it will not be a nuisance to its future user due to calls to the previous user of that telephone number.

The invention claimed is:

1. A method of managing at least one unallocated telephone number in a communication network, wherein the method is implemented by an item of network equipment and comprises:

updating, in a first data table storing unallocated telephone numbers, at least one piece of information relating to an activity level of the telephone number in the communication network, the piece of information relating to an activity level being representative of a number of call set-up requests to the telephone number received by the communication network for an observation period and being associated with the telephone number, the updating using a piece of information relating to a call set-up request received by the communication network to the telephone number during the observation period, wherein the piece of information relating to the call set-up request is obtained by querying, from the called telephone number, a second data table, referred to as an event table, updating the second table being decorrelated from updating the first table.

2. The management method according to claim 1, wherein the piece of information relating to an activity level comprises a counter of a number of call attempts to the telephone number during the observation period, and the updating comprises incrementing the counter using the piece of information relating to a call set-up request received by the communication network to the telephone number during the observation period.

3. The management method according to claim 1, the second table comprising entries associating with a telephone number error messages issued in response to requests to set-up a call to the telephone number.

4. The management method according to claim 1, wherein the method comprises:

obtaining information on a caller's membership of at least one given reputation class from at least one third data table, referred to as a reputation table; and updating the data table of unallocated telephone numbers is further dependent on the caller's membership of the at least one given reputation class.

5. A method of processing a request for allocating a telephone number to a user of a communication network, the method comprising, upon receipt of the allocation request:

selecting, from a first data table storing unallocated telephone numbers, the telephone number from a plurality of unallocated telephone numbers, according to a piece of activity level information and at least one selection criterion, the piece of activity level information being representative of a number of call set-up requests to the telephone number received by the communication network for an observation period and being associated with the telephone number, the first data table being updating using a piece of information relating to a call set-up request received by the communication network to the telephone number during the observation period, the piece of information relating to the call set-up request being obtained by querying, from the called telephone number, a second data table, referred to as an event table, updating the second table being decorrelated from updating the first table; and sending a response comprising the selected telephone number.

6. The method of processing a request for allocating a telephone number to a user of a communication network according to claim 5, wherein the piece of information relating to an activity level of the telephone number in the communication network comprises at least one piece of information relating to a counter of a number of call set-up requests to the number received by the communication network during the given observation period, and the method comprises checking the at least one selection criterion, the checking comprising comparing the piece of information with a given decision threshold, the decision to select the telephone number being made when the counter value is less than or equal to a given acceptability threshold.

7. The method of processing a request for allocating a telephone number according to claim 5, wherein the piece of information relating to an activity level of the telephone number comprises an activity indicator for taking one value among the values active and inactive and in that the at least one selection criterion comprises that the activity indicator has the value inactive.

8. The method of processing a request for allocating a telephone number according to claim 7, wherein the method comprises issuing a request for obtaining an unallocated telephone number to the data table, the request comprising the selection criterion.

9. A device for managing at least one unallocated telephone number in a communication network, the telephone number being previously allocated to a user of the communication network until a given date, known as suspension date, wherein the device is configured to implement at the level of an item of equipment of the network:

obtaining a piece of information relating to at least one call set-up request received by the communication network to the telephone number during a given period of time, referred to as an observation period, subsequent to the suspension date;

updating, at least according to the piece of information relating to at least one call set-up request, at least one piece of information relating to an activity level of the telephone number in the communications network, the piece of information relating to an activity level being representative of a number of requests to set-up a call to the telephone number received by the communication network for the given observation period and storing, in an entry of a first data table, referred to as a table of unallocated telephone numbers, the at least one piece of information relating to an activity level of the telephone number in association with the telephone number, the updating using a piece of information relating to a call set-up request received by the communication network to the telephone number during the observation period, wherein the piece of information relating to the call set-up request is obtained by querying, from the called telephone number, a second data table, referred to as an event table, updating the second table being decorrelated from updating the first table.

10. A device for processing a request for allocating a telephone number to a user of a telecommunication network, the device being configured to implement reception of the allocation request, selecting the telephone number from a plurality of unallocated telephone numbers and sending a response comprising the selected telephone number, wherein the selection comprises:
  obtaining an unallocated telephone number and at least one piece of information relating to an activity level of the telephone number in the communication network from a first data table, referred to as a table of unallocated telephone numbers, the table comprising entries, one entry associating a telephone number previously allocated to users until a given date, referred to as a suspension date, with a piece of information relating to an activity level of the telephone number during a given observation period, subsequent to the suspension date, the first data table being updating using a piece of information relating to a call set-up request received by the communication network to the telephone number during the observation period, the piece of information relating to the call set-up request being obtained by querying, from the called telephone number, a second data table, referred to as an event table, updating the second table being decorrelated from updating the first table;
  deciding to select the telephone number for the user according to the piece of information and at least one selection criterion; and
  repeating the obtaining and selection of another telephone number, as long as it has been decided not to select the telephone number.

11. A device for managing at least one unallocated telephone number in a communication network, wherein the device is configured to implement at the level of an item of equipment of the network:
  storing in a non-transitory computer-readable storage medium an entry of a first data table, referred to as a table of unallocated telephone numbers of a telecommunication network, the first data table comprising a plurality of entries, wherein each of the plurality of entries in the first data table associates with an unallocated telephone number at least one piece of information relating to an activity level of the telephone number in the communication network during a given time period, referred to as an observation period, the first data table being updated using a piece of information relating to a call set-up request received by the communication network to the telephone number during the observation period, the piece of information relating to the call set-up request being obtained by querying, from the called telephone number, a second data table, referred to as an event table, updating the second table being decorrelated from updating the first table.

12. A communication equipment in a telecommunication network, wherein the communication equipment comprises the device for managing at least one telephone number not allocated to a user of the network according to claim 9.

13. An item of communication equipment in a communication network, wherein the item comprises the device for processing a request to assign a telephone number to a user of the network according to claim 10.

14. A system for managing a telephone number to a user in a communication network, wherein the system comprises:
  a first device for processing a request for allocating a telephone number to a user of the network according to claim 10;
  a second device for managing at least one telephone number unallocated to a user of the network the telephone number being previously allocated to a user of the communication network until a given date, known as suspension date, wherein the second device is configured to implement at the level of an item of equipment of the network:
    obtaining a piece of information relating to at least one call set-up request received by the communication network to the telephone number during a given period of time, referred to as an observation period, subsequent to the suspension date;
    updating, at least according to the piece of information relating to at least one call set-up request, at least one piece of information relating to an activity level of the telephone number in the communications network, the piece of information relating to an activity level being representative of a number of requests to set-up a call to the telephone number received by the communication network for the given observation period and storing, in an entry of a first data table, referred to as a table of unallocated telephone numbers, the at least one piece of information relating to an activity level of the telephone number in association with the telephone number; and
  a non-transitory computer-readable storage medium configured to store the data table of the unallocated telephone numbers, the table comprising entries, wherein an entry in the table associates with an unallocated telephone number at least one piece of information relating to the activity level of the telephone number in the communication network during the observation period.

15. A processing circuit comprising a processor and a memory, the memory storing program code instructions of a computer program for implementing the method according to claim 1, when the computer program is executed by the processor.

* * * * *